INVENTOR.
WALTER HERBERT ERWIN WIDL
BY Hane and Nydick
ATTORNEYS

INVENTOR.
WALTER HERBERT ERWIN WIDL
BY Hane and Nydick
ATTORNEYS

Nov. 22, 1966 W. H. E. WIDL 3,287,575
LEVEL REGENERATING ARRANGEMENT FOR THE
TRANSMISSION OF BIPOLAR SIGNALS
Filed June 18, 1964 3 Sheets-Sheet 3
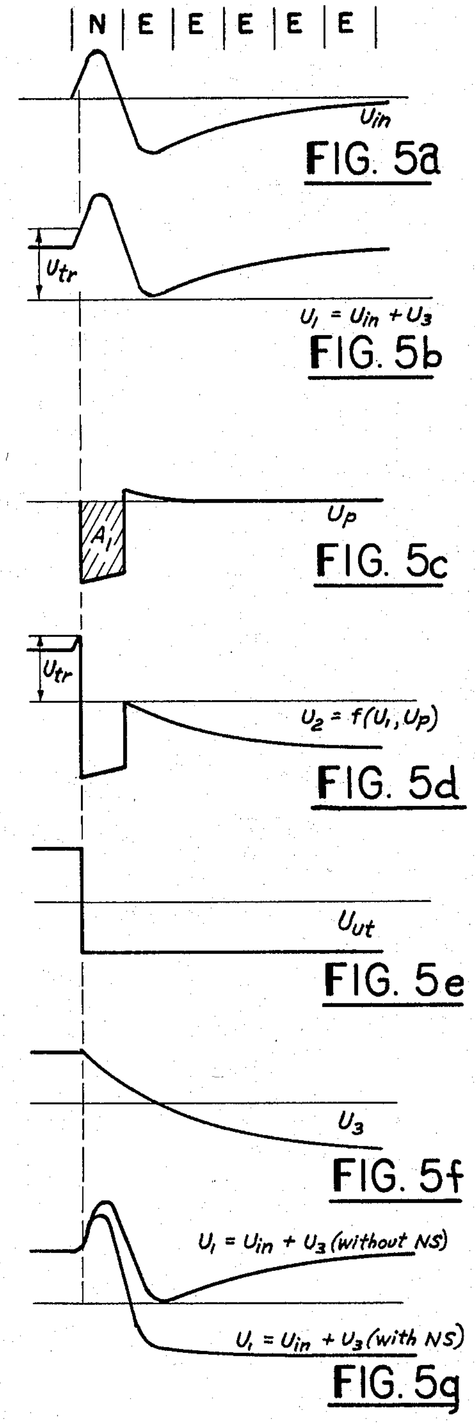
FIG. 5a, FIG. 5b, FIG. 5c, FIG. 5d, FIG. 5e, FIG. 5f, FIG. 5g
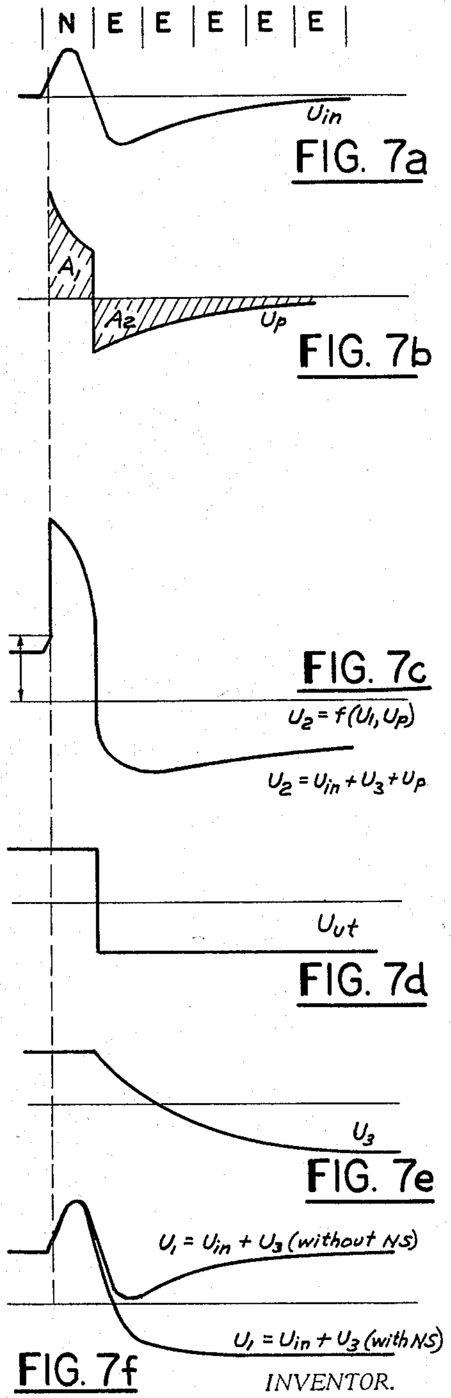
FIG. 7a, FIG. 7b, FIG. 7c, FIG. 7d, FIG. 7e
FIG. 7f
INVENTOR.
WALTER HERBERT ERWIN WIDL
BY
Hane and Nydick
ATTORNEYS United States Patent Office 3,287,575
Patented Nov. 22, 1966

3,287,575

LEVEL REGENERATING ARRANGEMENT FOR THE TRANSMISSION OF BIPOLAR SIGNALS

Walter Herbert Erwin Widl, Bandhagen, Sweden, assignor to Telefonaktiebolaget L M Ericsson, Stockholm, Sweden, a corporation of Sweden Filed June 18, 1964, Ser. No. 376,071
Claims priority, application Sweden, July 23, 1963, 8,134/63
3 Claims. (Cl. 307—88.5)

The present invention refers to a level regenerating system for the reception of bipolar signals, and more particularly to a system of this kind in which the regeneration of a signal received after an interruption is independent of the voltage level automatically occupied by the regenerating system after a prolonged interruption.

In data transmission an information is represented by positive and negative pulses thereby indicating that the spectrum of the signal takes up a certain frequency range. In certain systems the width of the frequency range is limited which has the consequence that the demodulated signal will not have any direct current component. In order to restore the direct current component a regenerating arrangement for low frequency is used. Such a regenerating arrangement comprises a summation circuit, a limiting amplifier and a low pass filter. The output signal from the output of the limiting amplifier is supplied through the low pass filter back to the summation circuit where it is added to the incoming signal and produces a regeneration of the original direct current component. Upon interruption of the signals the regenerating arrangement occupies one of two possible, stable positions in dependence on the output voltage of the limiting amplifier before the interruption. This can have the consequence that upon reoccurrence of the signal, the signal amplitude will not be sufficiently great for passing the zero threshold with reliability.

Said inconvenience is eliminated by the level regenerating arrangement according to the invention, comprising a transistor amplifier which becomes conducting when the amplitude of the signal obtained from the output of the summation circuit exceeds a threshold value, and a transformer the primary winding of which is included in the output circuit of the transistor amplifier and the secondary winding of which connects the output of the summation circuit with the input of the limiting amplifier, the transformer being so dimensioned that at the change of the condition of the transistor amplifier from blocking condition to conducting condition or vice versa there will be induced in the secondary winding a voltage which is oppositely directed to—and greater than the maximum value of the regenerating signal.

Figure 1:
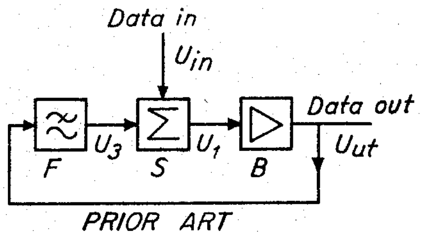
Fig. 1 PRIOR ART
Figures 2A, 2B, 2C, 2D, 2E:
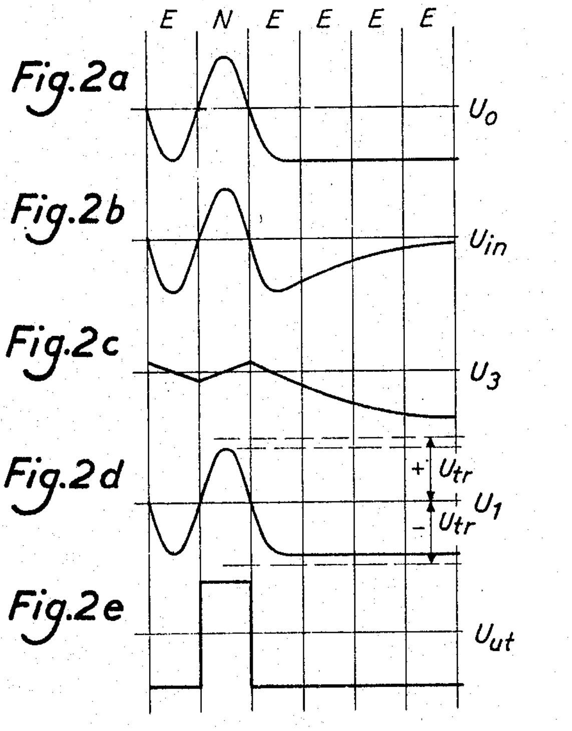
Figure 3:
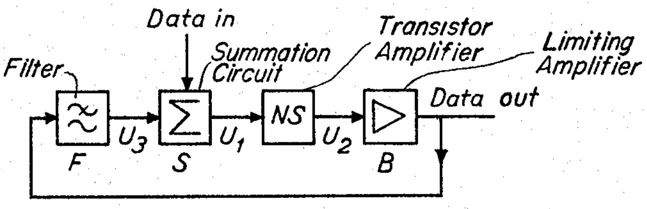
Figure 4:
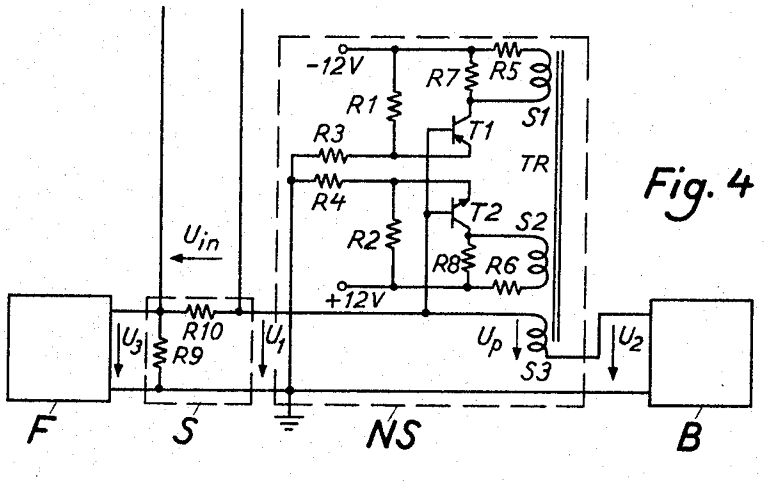
Figure 6:
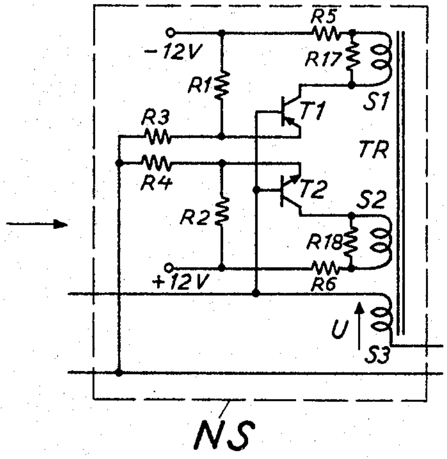

The invention will be described more closely below by means of two embodiments with reference to the accompanying drawing on which FIG. 1 shows a conventional level regenerating arrangement, FIGS. 2*a*–2*e* show the regulating process of a conventional level regenerating arrangement, FIG. 3 shows a block diagram of a level regenerating arrangement provided with a level stabilizer according to the invention, FIG. 4 shows an embodiment of the level stabilizer according to the invention, FIGS. 5*a*–5*g* show the regulating process obtained by means of the level stabilizer according to FIG. 4, FIG. 6 shows another embodiment of the level stabilizer according to the invention and FIGS. 7*a*–7*f* show the regulating process obtained by means of the level stabilizer according to FIG. 6.

FIG. 1 shows in the form of a block diagram a level regenerating arrangement of conventional type, comprising a low pass filter F, a summation circuit S and a limiting amplifier B. The incoming signal $U_{in}$ is supplied to the summation circuit S and through this to the limiting amplifier B, the output signal $U_{ut}$ of which is fed back to the summation circuit S through the filter F. The process appears from the FIGURES 2*a*–2*e*. FIG. 2*a* shows the original signal $U_o$ which is sent out and FIG. 2*b* shows the received signal $U_{in}$ which has no direct current component, FIG. 2*c* shows the compensating voltage U3 which is obtained by supplying the output signal from the limiting amplifier to the low pass filter F. In consequence of the time constant of the filter the compensating voltage will increase as a function of time so that by a suitable dimensioning of the filter, it can compensate the decrease of amplitude indicated in FIG. 2*b*. FIG. 2*d* shows the output voltage U1 obtained from the output of the summation circuit, said voltage U1 being the sum of the compensating voltage U3 obtained from the filter, and the input signal $U_{in}$. As it appears from FIG. 2*d* the obtained signal U1 shows a good correspondence with the original signal $U_o$. FIG. 2*e* shows the voltage $U_{ut}$ obtained from the output of the limiting amplifier and supplied to the filter from which voltage the compensating voltage according to FIG. 2*c* is obtained when it has been supplied to the filter. During a longer interruption the compensating signal U3 will be adjusted to its maximum level which may be positive or negative in dependence on the signal last obtained. This causes the drawback that if a signal is received after the interruption, it may happen that the limiter is not operated by the signal as the latter does not pass the O-threshold. The conditions are apparent from FIGS. 5*a* and 5*b* of which FIG. 5*a* shows the incoming signal and FIG 5*b* shows this signal added to the compensating voltage U3 which has been adjusted after a longer interruption. The letters E and N used in FIGS. 5*a* and 7*a* designate the pulses and pauses respectively in the received signal. When the sum signal is supplied to the input of the limiting amplifier the latter will not be operated by the negative signals due to the fact that the sum signal all the time is varying above the O-level as appears from FIG. 5*b*.

FIG. 3 shows a block diagram for a level regenerating arrangement provided with a level stabilizer NS according to the invention in order to eliminate the above mentioned drawback. In normal signal transmission the signal always varies between two limit values, for example +U1 max. and −U1 max. according to FIG. 2*d* which are located within the threshold values $+U_{tr}$ and $-U_{tr}$. Upon occurrence of a fault of the type discussed hereabove, the absolute value of the signal will exceed threshold value which in FIG. 5*b* and FIG. 5*d* is indicated by $U_{tr}$. Said exceeding of the threshold value may be used for operating a sensing or regulating arrangement according to the invention, one embodiment of which is shown more closely in FIG. 4. The arrangement comprises a transistor amplifier having two transistors T1 and T2 the collector circuits of which each includes a primary winding of a transformer TR. The input of the transistor amplifier is connected to the output of the summation circuit S and the emitters of the transistors are connected to a voltage divider which supplies to the emitter of the transistor T1 the negative threshold voltage and to the emitter of the transistor T2 the positive threshold voltage. The secondary winding S3 of the transformer is connected between the output of the summation circuit and the input of the limiting circuit. When the signal U1 exceeds the threshold in a positive or negative direction, one of the transistors will be conducting whereby a voltage impulse is induced in the secondary winding of the transformer which voltage impulse is greater than the incoming voltage and has an opposite polarity. In consequence of this the limiter will change polarity and it will again be responsive to the incoming signals. The conditions are shown in FIGURES 5*c*–5*g*. FIG. 5*d* shows the resultant voltage U2 obtained from the winding S3 of the transformer. As it appears the voltage impulse generated by the transformer winding is sufficiently great to change the polarity of the output signal of the limiting amplifier whereby the shape of the signal $U_{ut}$ of the limiting amplifier as shown in FIG. 5*e* will be obtained. When said signal is supplied to the low pass filter F, the resultant output signal of the filter will be as shown in FIG. 5*f* and this voltage will be added to the incoming signal. The resulting signal will be as shown in FIG. 5*g* and it appears that the signal which is supplied to the input of the limiting amplifier B can change the output signal polarity of said amplifier.

FIG. 6 shows another embodiment of the level stabilizer according to the invention which differs from that shown in FIG. 4 by the feature that upon exceeding the threshold value there will be induced on the input of the limiting amplifier a voltage having the same polarity as the incoming signal and thus still further increasing the fault. When the signal ceases the transformer TR will however function as a voltage source having opposite polarity as before whereby now an opposite polarity is added to the incoming signal, so that the limiting amplifier can change the polarity of the output signal. The conditions appear from FIGS. 7*a*–7*f* where FIG. 7*a* shows in a corresponding manner as FIG. 5*b* the sum signal U1, FIG. 7*b* shows the voltage $U_p$ induced in the transformer when exceeding the threshold voltage and FIG. 7*d* shows the resultant output signal $U_{ut}$ from the limiting amplifier. FIG. 7*c* shows the resulting voltage U2 obtained from the summation circuit. As it appears also in this case a reversal of the output polarity of the limiting amplifier will take place and the only difference is that this occurs when the signal ceases and not on exceeding the threshold voltage as in the preceding case.

I claim:

1. Apparatus for regenerating a direct voltage level in response to receiving alternating voltage signals, comprising: a limiting amplifier including an input and an output for transmitting signals of first or second levels; a voltage-summing circuit including a first input for receiving the alternating voltage signals, a second input and an output for transmitting signals representing the sum of voltages received at the inputs; a low-pass filter means including an input connected to the output of said limiting amplifier and an output connected to the second input of said summing circuit; a transistor amplifier means including an input connected to the output of said voltage-summing circuit and an output; and a transformer including primary winding means connected to the output of said transistor amplifier means and a secondary winding serially connected between the output of said voltage-summing circuit and the input of said limiting amplifier; said transistor amplifier means being conductive only when the voltage of the signal transmitted from the output of said voltage-summing circuit exceeds a given amplitude, whereby said secondary winding produces a pulse voltage in response to the conduction of said transistor amplifier means.

2. The apparatus of claim 1, wherein said secondary winding is wound in phase opposition to said primary winding means so that voltage signals generated by said secondary winding oppose the signals transmitted from the output of said voltage-summing circuit.

3. The apparatus of claim 1, wherein said secondary winding is wound in phase with said primary winding means so that upon termination of conduction by said transistor amplifier means the resultant voltage signal generated by said secondary winding causes a change in the level of the signal transmitted by the output of said limiting amplifier.

No references cited.

ARTHUR GAUSS, *Primary Examiner.*

J. ZAZWORSKY, *Assistant Examiner.*